Figure 1:
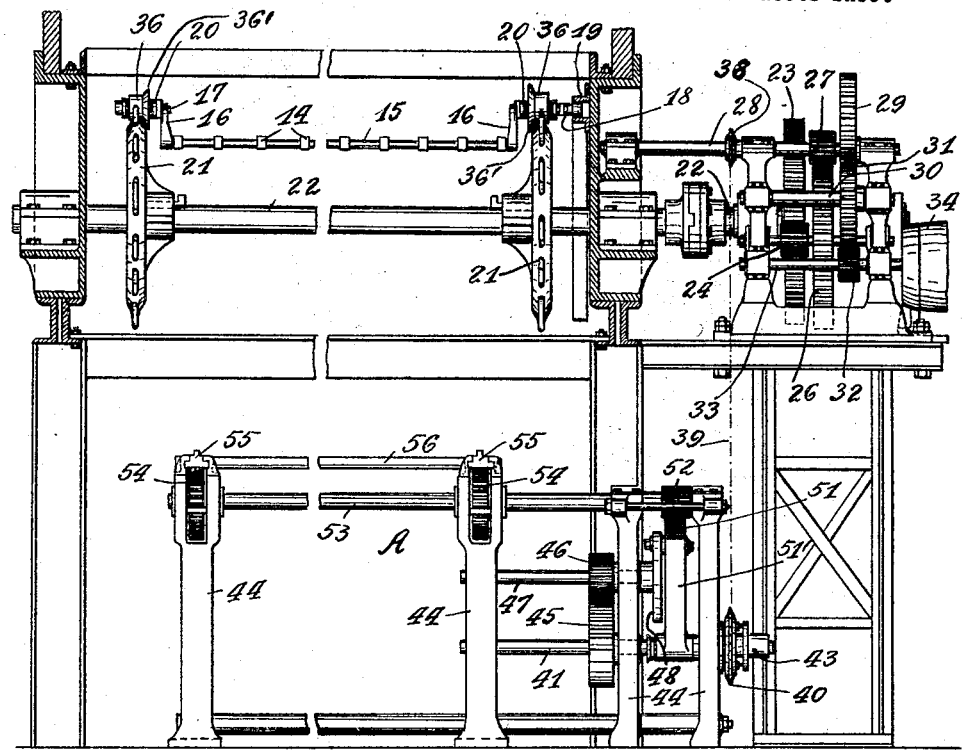

Nov. 4, 1924.  1,514,362

R. E. BAKER ET AL

DISCHARGE DEVICE

Original Filed March 21, 1917   3 Sheets-Sheet 1

INVENTORS
ROBERT E. BAKER.
ARTHUR F. CUMMINS.
EARDLEY H. FORD.
BY
John Loska
ATTORNEY Nov. 4, 1924.

R. E. BAKER ET AL 1,514,362

DISCHARGE DEVICE

Original Filed March 21, 1917    3 Sheets-Sheet 2

INVENTORS:
ROBERT E. BAKER.
ARTHUR F. CUMMINS.
EARDLEY H. FORD.

BY John Lotka
ATTORNEY.

Nov. 4, 1924.
R. E. BAKER ET AL
1,514,362
DISCHARGE DEVICE
Original Filed March 21, 1917  3 Sheets-Sheet 3
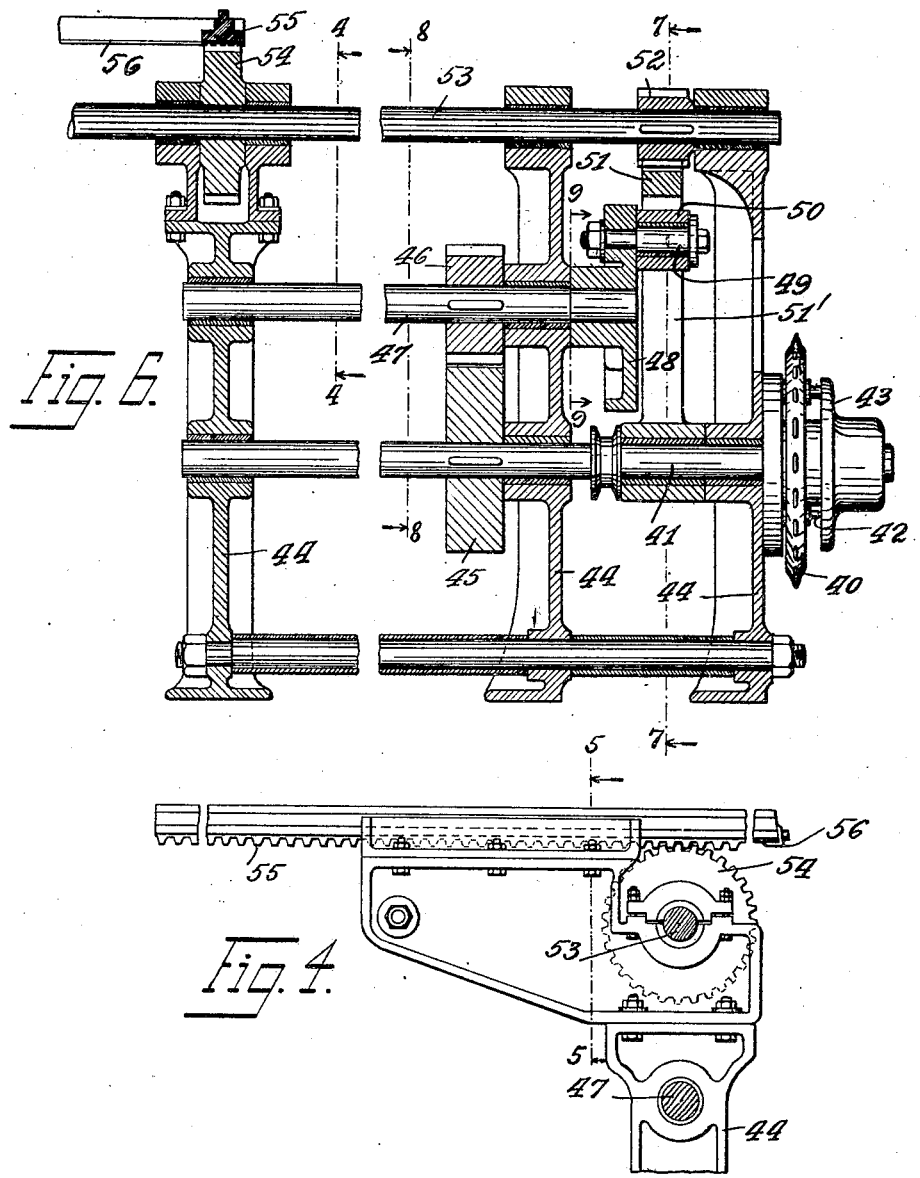
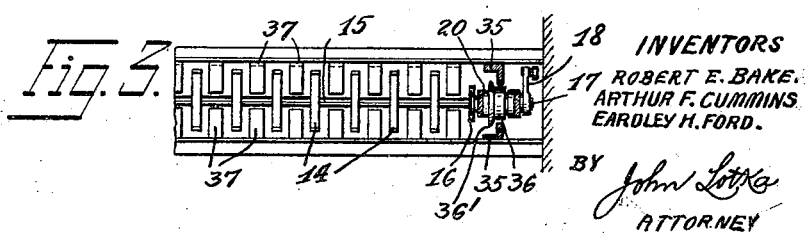
INVENTORS
ROBERT E. BAKER
ARTHUR F. CUMMINS
EARDLEY H. FORD.
BY John Lotka
ATTORNEY Patented Nov. 4, 1924.

1,514,362

UNITED STATES PATENT OFFICE.

ROBERT ELMER BAKER, OF BRONXVILLE, ARTHUR FRANCIS CUMMINS, OF WHITE PLAINS, NEW YORK, AND EARDLEY HARRY FORD, OF LOS ANGELES, CALIFORNIA, ASSIGNORS, BY MESNE ASSIGNMENTS, TO JOSEPH BAKER SONS & PERKINS COMPANY, INC., OF WHITE PLAINS, NEW YORK, A CORPORATION OF NEW YORK.

DISCHARGE DEVICE.

Original application filed March 21, 1917, Serial No. 156,275. Divided and this application filed November 12, 1920. Serial No. 423,722.

*To all whom it may concern:*

Be it known that we, ROBERT ELMER BAKER, a resident of Bronxville, in the county of Westchester and State of New York, ARTHUR FRANCIS CUMMINS, formerly of Nutley, in the county of Essex and State of New Jersey, but now a resident of White Plains, in the county of Westchester and State of New York, and EARDLEY HARRY FORD, formerly of Brooklyn, in the county of Kings, city and State of New York, but now a resident of Los Angeles, in the county of Los Angeles and State of California, all three subjects of the King of Great Britain, have jointly invented certain new and useful Improvements in Discharge Devices, of which the following is a specification.

Our present invention relates to disharge devices for use in connection with conveyor mechanisms, and has been devised particularly for use in machines for "proving" dough before baking it. In the type of proving machine to which this invention is intended to be applied primarily, a conveyor is employed for carrying through the proving chamber, the trays, tins, or other containers in which the dough has been placed, and at the outlet of such chamber, the containers are removed from the longitudinally-travelling conveyor by a discharge device operating transversely of the conveyor path. The conveyor is intended to be operated with a continuous movement, while the discharge device is actuated intermittently, for the periodical removal of said containers (with the dough therein) from the conveyor, and our improved discharge device has been so designed as to operate in a perfectly satisfactory manner in conjunction with a continuously moving conveyor. This discharge device has novel features, particularly in the means for driving it, causing its motion to take place with a speed which at first increases gradually and then decreases gradually, both during its active or working stroke and during its return stroke, the latter taking place in less time than the working stroke.

This application is a division of an application for United States patent filed by us March 21, 1917, Serial No. 156,275, which has matured into Patent No. 1,412,444, dated April 11, 1922.

Figure 7:
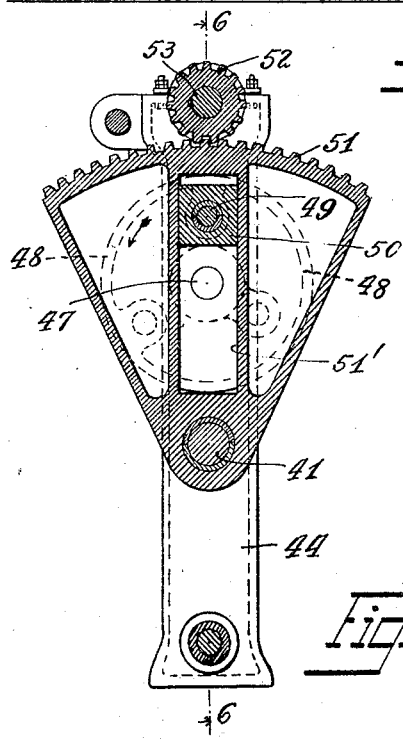
Figure 8:
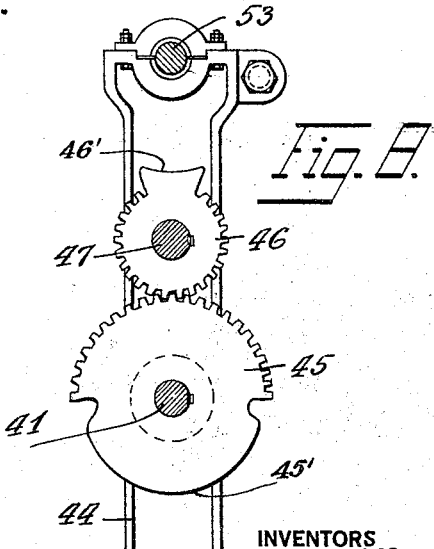
Figure 2:
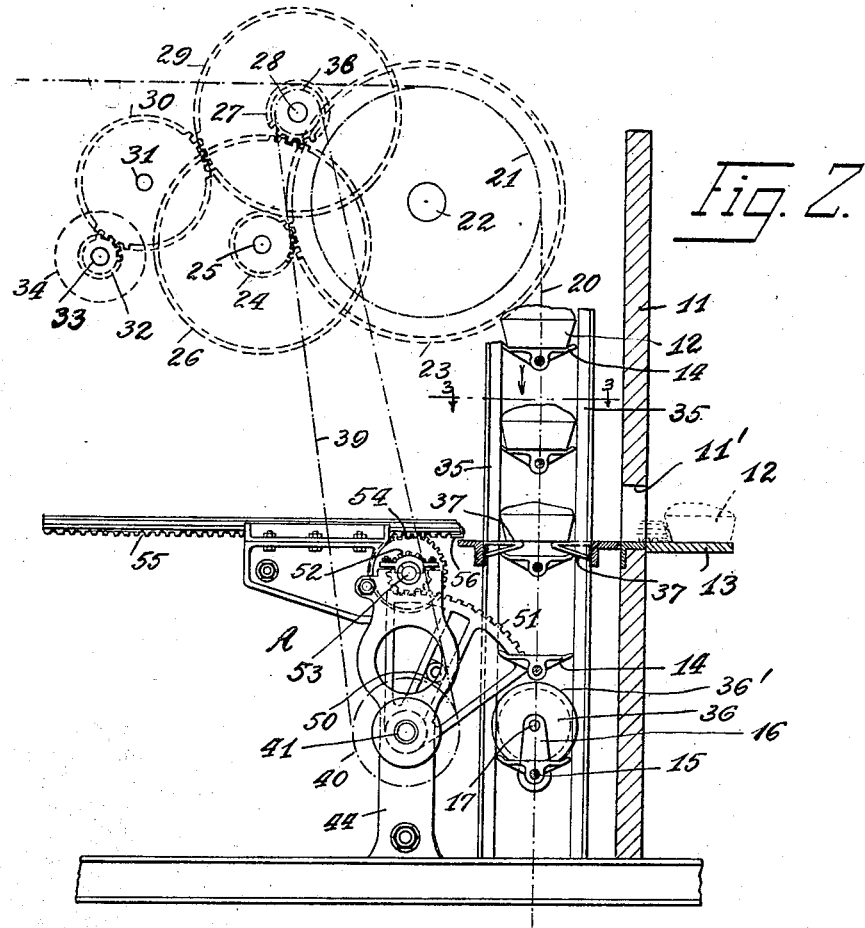
Figure 5:
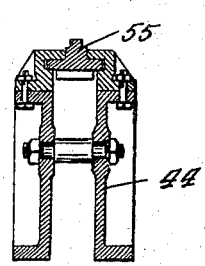
Figure 10:
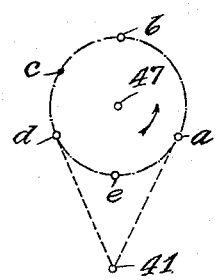
Figure 9:
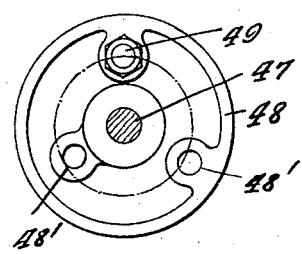

For a better explanation of our invention, we will now proceed to describe in detail an example of a machine embodying our improved discharge device, as represented in the accompanying drawings, in which Fig. 1 is an end elevation of a portion of the proving chamber showing part of the conveyor, the discharge device, and the driving means; Fig. 2 is a side elevation, with parts in section, showing chiefly the arrangement of the discharge device and of the driving means; Fig. 3 is a detail horizontal section on line 3—3 of Fig. 2; Fig. 4 is a vertical section of the upper portion of the discharge device, taken on line 4—4 of Fig. 6; Fig. 5 is a detail section on line 5—5 of Fig. 4; Fig. 6 is a vertical section on line 6—6 of Fig. 7; Fig. 7 is a vertical section on line 7—7 of Fig. 6; Fig. 8 is a partial vertical section on the plane indicated by the line 8—8 in Fig. 6, but showing the parts in a different position; Fig. 9 is a detail vertical section on line 9—9 of Fig. 6; and Fig. 10 is a diagram illustrating the operation of the discharge device.

In Fig. 2, we have indicated at 11 one of the walls of the proving chamber, with an opening 11' through which the trays, tins, or other containers 12 are adapted to be pushed out of said chamber by the action of the discharge device designated, in its entirety, by the letter A. The action of the discharge device delivers such containers to a support 13, which may be a table, or it may be a conveyor for transferring the containers thus deposited on it, to the baking oven (not shown). These containers travel through the proving chamber, being carried therethrough by a conveyor which may be of any suitable construction and therefore need not be described herein in all its details. The containers 12 rest on carriers 14, connected with the conveyor in such a manner as to keep the carriers and containers horizontal during their travel. Thus, the carriers may be secured rigidly to rods 15 connected by cranks 16 to short shafts 17 which are also provided with other cranks 18 engaging stationary guides 19. The shafts 17 form the pivot connections for the links of the conveyor chains 20, guided and supported at appropriate points by suitable parts, among which are the driving sprockets 21 mounted rigidly on the shaft 22. This shaft also carries a gear wheel 23, in mesh with a pinion 24 on a shaft 25, which also carries a gear wheel 26 in mesh with a pinion 27 on a shaft 28. This shaft also carries a gear wheel 29, meshing with a gear 30 on a shaft 31, said gear 30 being also in mesh with a pinion 32 on a shaft 33, driven in any suitable manner, but preferably by means of an electric motor, indicated at 34.

At 35 we have indicated guides arranged vertically and adapted to be engaged by portions of the conveyors, say by rollers 36 mounted loosely on the conveyor pivots 17, to steady the conveyor laterally adjacent to the outlet 11', against the pushing action of the discharge device A. The guides 35 are so placed that the rollers 36 will pass between them, and as shown, the rollers are provided with flanges 36' engaging the guides 35 in the same manner as the flanges of the wheels of railway carriages, so as to prevent any motion of the conveyor chains laterally, or transversely of their planes. These flanges might engage in a similar manner, other guides or rails (not shown) arranged at other portions of the conveyor's path. The tins or other containers 12, when brought into registry with the opening 11' by the movement of the conveyor, are arrested by spaced stationary fingers or supports 37 (see Figs. 2 and 3), and as it were, lifted off the carriers, which pass between the spaced fingers, whereupon the discharge device will push such containers from the supports 37 through the opening 11' and transfer them to the table or other support 13, as referred to above.

The discharge device is driven from the shaft 28 (or in any other suitable manner), say by means of a sprocket wheel 38 secured rigidly to said shaft, and connected by a chain 39 with a larger sprocket 40 on the main shaft 41 of the discharge device. Preferably, according to another invention of ours explained more fully in a separate application, filed simultaneously herewith, Serial No. 423,723, the connection between the shaft 41 and the sprocket 40, while rigid under normal conditions, is such as to insure its breaking in the case of an abnormal strain on the discharge device or on any of of the parts connecting said sprocket with the discharge device proper. For this purpose, a pin 42, having a weakened portion, may be employed to connect the sprocket 40 with a collar 43 having a permanent rigid connection with the shaft, but the sprocket 40 is connected with the shaft only by said pin 42, and becomes free or loose on the shaft when the pin 42 breaks, so that in this case the shaft 41 together with the discharge device, may stop notwithstanding the continued rotation of said sprocket 40.

The construction and operation of the discharge device are as follows: The main shaft 41 is journaled in a suitable frame or standards 44 and carries rigidly a gear 45 in mesh with a pinion 46 rigidly secured to a counter shaft 47 likewise journaled in said frame. On the countershaft 47 is further secured rigidly a disk 48, from which projects a crank pin 49. Preferably, as shown, the disk is provided with three (or more) sockets 48', at different distances from the center of the countershaft 47, so that the degree of eccentricity of the crank pin 49 may be varied by securing it in one of these sockets or another. The crank pin 49 extends loosely through a slide 50, movable in and out along a radial guideway 51' of a toothed sector 51 which is mounted loosely on the main shaft 41, so that it may rock thereon. This sector is in mesh with a pinion 52, mounted rigidly on a shaft 53 which extends across the machine and also carries rigidly two pinions 54 in mesh with racks 55 suitably guided in the frame 44, to slide towards and from the discharge opening 11'. These two racks 55 are connected at their forward or outer portions by a cross bar or pusher 56 of such length and position that it may pass between the two chains of the proving conveyor and push the tins or containers 12 from the supports 37. Fig. 2 shows the pusher in its extreme inner or retracted position. The meshing wheels 45, 46 are mutilated gear wheels, so formed that during half a revolution of the shaft 41 the wheel 46 will be driven and perform a full revolution (the radius of the pinion 46 being equal to half the radius of the gear wheel 45), while during the other half revolution of the wheel 45 the pinion 46 will be held stationary and steady by its engagement with the wheel 45. Notwithstanding the fact that the shaft 41 and therefore the wheel 45 rotate continuously, the peculiar drive described above will produce an intermittent reciprocating movement of the pusher 56, the outward or active movement being relatively slow, and the inward or return movement relatively rapid, although each of these movements or strokes increases in speed gradually from zero to a maximum and then again decreases to zero. This will be understood best by reference to the diagram Fig. 10, in which the circle indicates the path of the crank pin 49 around the center of the shaft 47, while the two straight lines indicate tangents from the center of the shaft 41 to said circle, at the points $a$ and $d$ respectively. With the proportions shown, the arc $a\ b\ c\ d$ is just twice as long (240°) as the arc $d\ e\ a$ (120°). With the pusher 56 in its retracted position (Fig. 2) and just as the same is about to begin its outward stroke, the crank pin 49 is at the point *a*. The wheels 45, 46 are just beginning to mesh, and the shaft 47 with the crank pin 49 begins to rotate in the direction indicated by the arrow. The right-hand tangent of Fig. 10 may be said to represent the center line of the guide 51' at the beginning of this movement. As the shaft 47 revolves, the pin 49 and the slide 50 cause the sector 51 to rock from right to left as long as the pin 49 is traveling on the arc *a b c d*, and from left to right when the pin is traveling along the arc *d e a*. The swinging of the sector 51 from right to left corresponds to the working stroke of the pusher, and the swinging from left to right to the return stroke. It will be obvious that the velocity of the swinging movement of the sector, which was zero at the start (point *a*) increases gradually until it attains a maximum at the point *b* located on the diameter passing through the centers of both shaft 41 and 47. Then the velocity again decreases gradually from said point *b* (position shown in Figs. 6, 7 and 9) along the arc *b c d* until it again becomes zero at the point *d*. (The point *c*, diametrically opposite to the starting point *a*, indicates the position of the crank pin 49 at the time the relative position of the gear wheels 45, 46 is as shown in Fig. 8). The sector 51 then swings in the opposite direction, from left to right, while the crank pin 49 travels along the arc *d e a*, the speed of the swinging movement (and therefore, of the sliding movement of the pusher 56) being zero at *d* and increasing gradually to the central point *e*, to then again decrease gradually to the point *a*, where the velocity of the sector and of the pusher again becomes zero. While the movement of the crank pin 49 is continuous and a uniform rate of speed, throughout the complete revolution above described, along the path *a b c d e a*, the crank pin 49 comes to a rest when it reaches the point *a* at the end of such revolution, and then remains at rest during an interval of time equal to that taken for said revolution. While the crank pin is at rest (and with it the sector 51 and the pusher 56), the rotating surface 45' slides along the stationary concave surface 46', thus holding the sector 51 and the pusher 56 against accidental movement. It will be understood that, since the crank pin 49 at the time of its movement rotates at a uniform rate of speed, the time taken for the outward or active stroke of the pusher (arc *a b c d*) is considerably more than the time taken for the return stroke (arc *d e a*), said return stroke, in the example shown, taking just half the time that is required for the operative stroke of the pusher. It will be evident that the maximum speed reached during the working stroke (point *b*) is considerably less than the maximum speed reached during the return stroke (point *e*), the speed at *b* being less than half the speed at *e*. As a result, we obtain, during one complete revolution of the main shaft 41, the following operation: During the first half of said revolution, the shaft 47 will be driven, performing a complete revolution during this time. During the major part of this complete revolution of the shaft 47 (two-thirds of a revolution of the shaft 47, corresponding to one-third of a revolution of the main shaft 41) the sector 51 and the pusher 56 will be given their working stroke at a speed increasing gradually from zero to a maximum, and then decreasing again to zero. During the remaining smaller part of the revolution of the shaft 47 (one-third of a revolution in the example shown, corresponding to one-sixth of a revolution of the main shaft 41), a return movement will be imparted to the sector 51 and pusher 56, such return movement increasing in speed gradually from zero to a maximum greater than the maximum speed of the working stroke, and then again decreasing to zero. It will be obvious that since the return movement takes place in a much shorter time than the working stroke, the velocity (that is, the average velocity) during the return stroke will be much greater than that during the working stroke, enabling the machine to be operated more efficiently. It is not practicable to operate the pusher at a relatively high speed during the working stroke, owing to the danger of injuring the dough, or upsetting the tins on the table 30. During the second half of the revolution of the main shaft 41 the shaft 47 and the pusher 56 will remain at rest.

Of course, the movements of the pusher and of the proving conveyor will be so timed that between two successive working strokes of the pusher 56, the conveyor will advance a distance equal to the length of the chain links, that is to say, a distance equal to the space between two adjacent chain pivots 17.

The guides 35 will brace the conveyor at the outlet portion of the proving chamber, and will prevent swaying of the conveyor under the influence of the transverse movement of the pusher 56. In order to secure an efficient steadying action, the guides 35 of the same pair are preferably placed at a greater distance apart than the adjacent ends of opposite fingers or supports 37 (see Figs. 2 and 3).

Various modifications may be made without departing from the nature of our invention as set forth in the appended claims.

We claim as our invention:

1. In a machine for proving dough, a proving chamber, a conveyor comprising a pair of parallel flights adapted to move in said chamber to feed the dough, a reciprocating discharge device arranged to penetrate the path of the flights of the conveyor for removing dough from said chamber, and drive mechanism for imparting to said device a relatively slow outward or active stroke, a relatively quick inward or inactive return stroke, and, at the end of said return stroke, a period of dwell or rest lasting as long as the said active and return stroke together.

2. In a machine for proving dough, a proving chamber, a conveyor comprising a plurality of flights adapted to move in said chamber to feed the dough, a reciprocating discharge device located between said flights and adapted to penetrate the path thereof for removing dough from said chamber, and drive mechanism for imparting to said discharge device, a relatively slow outward or active stroke, a relatively quick inward or inactive return stroke and at the end of said return stroke a period of dwell or rest lasting as long as the said active and return strokes together, said drive mechanism, comprising a mutilated gear with teeth on one-half of its periphery, and a toothless portion of 180°, a pinion adapted to be driven a complete revolution by the teeth on said mutilated gear, and having a gap between the ends of its toothed arc and a concave locking surface in said gap to co-operate with the convex toothless portion of said gear, whereby the period during which said pinion is driven will be of the same length as the period during which said pinion is at rest, and an operative connection between said pinion and the discharge device to impart a reciprocating motion to such device.

3. In a machine for proving dough, a proving chamber, a conveyor comprising a pair of parallel endless chains adapted to move in said chamber to feed the dough, a discharge device arranged to reciprocate across the path of of said chains for removing dough from said chamber, and drive mechanism for imparting to said discharge device, a relatively slow outward or active stroke, a relatively quick inward or inactive return stroke and at the end of said return stroke a period of dwell or rest lasting as long as the said active and return strokes together, said mechanism comprising a mutilated gear with teeth on one-half of its periphery, and a convex toothless portion of 180°, a mutilated pinion adapted to be driven a complete revolution at each meshing with the teeth of said gear, said pinion having a concave locking surface in the gap between the ends of its toothed arc, to co-operate with said convex toothless portion of the gear, whereby the period during which said pinion is driven will be of the same length as the period during which the pinion is at rest, and an operative connection between said pinion and the discharge device to impart a reciprocating motion to such device, said connection including mechanism for causing the movement of the discharge device in the direction of the discharge to take place at a slower speed than the return movement of said discharge device.

4. In a machine for proving dough, a proving chamber, a conveyor comprising a pair of spaced parallel flights adapted to move in said chamber to support and feed the dough, a reciprocating discharge device constructed and arranged to penetrate the path of the flights of the conveyor for removing dough from said chamber, driving mechanism for imparting to said discharge device, a relatively slow outward or active stroke, a relatively quick inward or inactive return stroke and at the end of said return stroke a period of dwell or rest lasting as long as the said active and return strokes together, said mechanism comprising an oscillating member operatively connected with the said discharge device and provided with an outwardly-extending guide track, a drive shaft provided with a plurality of crank sockets of different eccentricity, and a crank member adapted for attachment to any one one of said sockets and for movement along said guide track.

5. In a machine for proving dough, a proving chamber, a conveyor comprising a pair of spaced parallel flights adapted to move in said chamber to support and feed the dough, a reciprocating discharge device constructed and arranged to penetrate the path of the flights of the conveyor for removing dough from said chamber driving mechanism for imparting to said discharge device, a relatively slow outward or active stroke, a relatively quick inward or inactive return stroke and at the end of said return stroke a period of dwell or rest lasting as long as the said active and return strokes together, said mechanism comprising a rack connected with said discharge device, a pair of connected pinions one of which meshes with said rack, an oscillating toothed sector meshing with the other pinion, and means for driving said sector.

6. In a machine for proving dough, a proving chamber, a conveyer comprising a plurality of spaced parallel chains adapted to move in said chamber and carry the dough therethrough, a discharge device adapted to reciprocate across the path of said chains for removing the dough from said conveyor and chamber, and means for imparting to said discharge device a relatively slow outward or active stroke and a relatively quick inward or inactive stroke, said means comprising an oscillating member, provided with a guide track extending radially from the pivotal axis of said oscillating member, a bearing slidable along said track, a crank rotatable within said bearing, means to rotate said crank, and means to operatively connect said oscillating member and discharge device.

7. In a machine for proving dough, a proving chamber, a conveyor adapted to move in said chamber and carry the dough therethrough, a reciprocating discharge device adapted to penetrate the path of said conveyor for removing the dough from said conveyor and chamber, and means for imparting to said discharge device a relatively slow outward or active stroke and a relatively quick inward or inactive stroke, said means comprising an oscillating toothed sector provided with a guide track extending radially from the pivotal axis of said sector, a pair of interconnected pinions driven by said sector, a pair of racks meshing with said pinions and connected with said discharge device, a bearing slidably mounted in said guide track, a crank rotatably mounted in said bearing and means to rotate said crank.

In testimony whereof we have signed this specification.

ROBERT ELMER BAKER.
ARTHUR FRANCIS CUMMINS.
EARDLEY HARRY FORD.